(12) United States Patent
Drabon

(10) Patent No.: US 6,671,169 B1
(45) Date of Patent: Dec. 30, 2003

(54) POWER CONVERTER WITH DIRECT VOLTAGE AND ALTERNATING VOLTAGE BUSES

(76) Inventor: Rodscha Drabon, Theresienstrasse 1, D-68535 Edingen-Neckarhausen (DE)

(*) Notice: Subject to any disclaimer, the term of this patent is extended or adjusted under 35 U.S.C. 154(b) by 0 days.

(21) Appl. No.: 09/830,947
(22) PCT Filed: Nov. 5, 1999
(86) PCT No.: PCT/EP99/08500
§ 371 (c)(1), (2), (4) Date: Jun. 5, 2001
(87) PCT Pub. No.: WO00/28649
PCT Pub. Date: May 18, 2000

(30) Foreign Application Priority Data

Nov. 6, 1998 (DE) .......................... 198 51 161

(51) Int. Cl.[7] ................................. H02B 1/20
(52) U.S. Cl. ................ 361/648; 361/642; 174/68.2; 174/95; 363/37; 257/684
(58) Field of Search ................ 361/115, 23, 18, 361/30, 52, 62, 100, 103, 638, 639, 642–649, 675, 637; 174/68.2, 95, 149 R, 70 R, 71 R, 72 A, 72 B, 99 B; 363/37, 144, 132; 257/684, 686, 688, 689, 691, 693, 700, 709

(56) References Cited

U.S. PATENT DOCUMENTS

| | | | | |
|---|---|---|---|---|
| 4,739,447 A | * | 4/1988 | Lecomte ........................ | 361/386 |
| 4,809,153 A | * | 2/1989 | Bremer et al. ................ | 363/141 |
| 4,943,904 A | * | 7/1990 | Van Antwerp et al. ....... | 363/144 |
| 5,365,424 A | * | 11/1994 | Deam et al. .................. | 361/637 |
| 5,574,312 A | * | 11/1996 | Bayerer et al. .............. | 257/706 |
| 5,635,757 A | * | 6/1997 | Stockmeier et al. ......... | 257/691 |
| 5,777,849 A | * | 7/1998 | Bayerer et al. .............. | 361/730 |
| 5,835,362 A | * | 11/1998 | Keller et al. .................. | 363/37 |
| 5,936,833 A | * | 8/1999 | Grossman et al. ........... | 361/638 |
| 6,160,696 A | * | 12/2000 | Bailey et al. ................. | 361/115 |

* cited by examiner

Primary Examiner—Michael Daitskovsky
(74) Attorney, Agent, or Firm—Howrey Simon Arnold & White

(57) ABSTRACT

The invention relates to a power converter comprising several semiconductors (1) and direct voltage and alternating voltage buses (8/9, 4) for electric contact between the direct and alternating voltage connections (3, 2) of the power semiconductors (1). The buses are divided into two parts so that the alternating voltage bus (4) and the direct voltage bus (8/9) do not come into physical contact with each other. One advantage of the invention is that no creepage paths between the direct voltage and alternating voltage buses need to be taken into consideration.

9 Claims, 1 Drawing Sheet

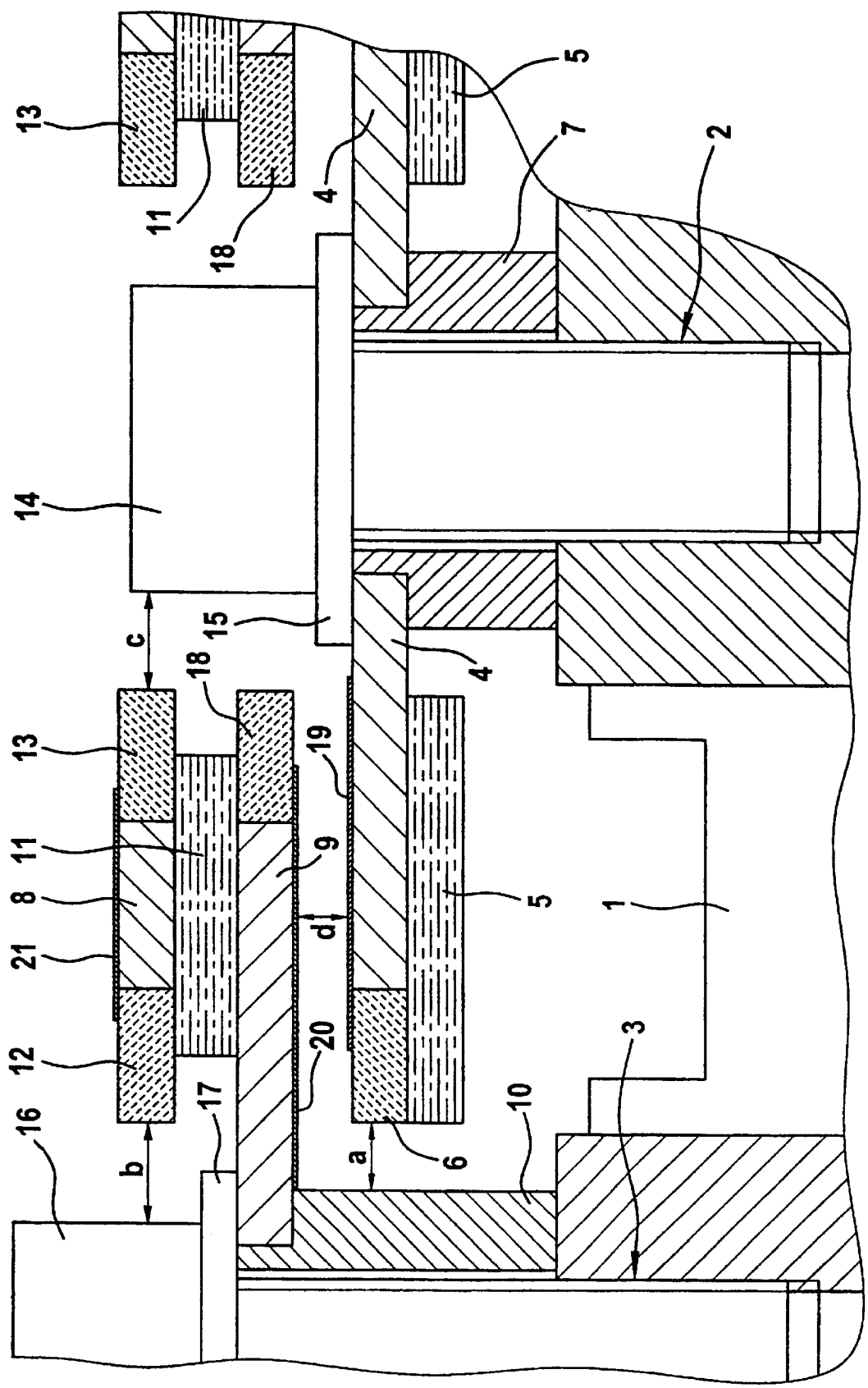

POWER CONVERTER WITH DIRECT VOLTAGE AND ALTERNATING VOLTAGE BUSES

The invention relates to a converter appliance having a plurality of power semiconductors and a DC and AC voltage busbar arrangement for making electrical contact with DC and AC voltage connections of the power semiconductors.

The term "busbar arrangement" is generally understood here as being a system comprising a plurality of flat, strip-like busbars which are made of highly electrically conductive material and have different electrical potentials applied to them, the physical distance between the rails, and the overall rail configuration, being rigidly stipulated in order to achieve precisely defined inductances and capacitances for the busbar arrangement which are independent of influences associated with assembly.

Such a converter appliance is disclosed in DE 44 12 990 A1. This document describes a converter unit having liquid- or air-cooled power semiconductors and a DC voltage intermediate circuit, with the connection rail system being designed completely as a sandwich system. The DC voltage busbar arrangement and the AC voltage busbar arrangement are combined, with insulation layers placed in between, thus forming a five- or seven-layer sandwich structure, for example. However, with this configuration, the prescribed creepage paths between the busbar arrangements, which are at different electrical potentials, have to be taken into account in order to ensure lasting electrical safety. Particularly at relatively high voltages, this results in relatively high insulation complexity, which entails increased cost.

The invention is based on the object of specifying a converter appliance with a DC and AC voltage busbar arrangement of the aforementioned type, which the busbar arrangement can be produced at reduced cost.

This object is achieved in connection with the features of the preamble to patent claim 1 in that the busbar arrangement is of two-part design, so that the AC voltage busbar arrangement and the DC voltage busbar arrangement have no physical connection with one another.

The advantages which can be achieved with the invention are, in particular, that there are no creepage paths, but only the required clearances, to be considered between the AC voltage busbar arrangement and the DC voltage busbar arrangement. Particularly at relatively high voltages, this concept produces a flat, economical and low-inductance busbar arrangement which is of space-saving design.

Advantageous refinements of the invention are identified in the subclaims.

The invention is explained below with the aid of the illustrative embodiment shown in the single FIGURE.

The FIGURE shows a section through a detail of a converter appliance. It shows a power semiconductor 1—preferably an IGBT module—having an AC voltage connection 2 and a DC voltage connection 3. The AC voltage connection 2 and the DC voltage connection 3 are designed as bushes for screw bolts to engage in. The converter appliance has further power semiconductors (not shown here) which are preferably mounted on a liquid- or air-cooled cold plate in a manner which is known generally.

The AC voltage connection 2 is in contact with a flat, strip-like AC voltage busbar arrangement 4, the AC voltage busbar arrangement 4 being covered with an insulation layer 5 (top or bottom), and end edges at perforations in the busbar arrangement being provided with an insulation layer 6 (for example insulating ring or close-fitting insulation foil). In order to achieve the desired distance between the surface of the power semiconductor and the AC voltage busbar arrangement, a bush or sleeve 7 of appropriate length is pressed into a hole in the AC voltage busbar arrangement 4, a screw bolt 14 extends through the bush or sleeve 7 into the AC voltage connection 2, with a washer 15 expediently being inserted between the screw bolt 14 and the AC voltage busbar arrangement 4.

Besides the AC voltage busbar arrangement 4, the converter appliance has a positive and a negative DC voltage busbar arrangement 8 and 9, respectively, for making contact with the positive and the negative DC voltage potential. The DC voltage busbar arrangement 8/9 is designed as a three-layer sandwich system with an insulation layer 11 placed in between. End edges at perforations in the DC voltage busbar arrangement 8/9 are provided with insulation layers 12, 13, 18 (for example insulating rings).

Electrical contact is made between the DC voltage connection 3 and the negative DC voltage busbar arrangement 9 in the same way as has been described above for contact with the AC voltage connection 2. A screw bolt 16 extends through a hole, provided with a pressed-in bush or sleeve 10 of desired length, in the DC voltage busbar arrangement 9 into the DC voltage connection 3 of the power semiconductor 1, with a washer 17 expediently being inserted between the screw bolt 16 and the DC voltage busbar arrangement 9.

Electrical contact (not shown) is made between the positive DC voltage busbar arrangement 8 and a DC voltage connection of a power semiconductor of the converter appliance in the same way.

The essential feature of the converter appliance's busbar arrangement described above, which is preferably made of copper, is the physical division of the AC voltage busbar arrangement 4, on the one hand, and the DC voltage busbar arrangement 8/9, on the other hand. This structural design means that there are no creepage paths between the AC voltage busbar arrangement 4 and the DC voltage busbar arrangement 8/9. It is merely necessary to adhere to the clearances required depending on the electrical potentials, and, accordingly, to take them into account in the design.

In this regard, the figure shows, by way of example, the relevant clearance a between the bush or sleeve 10b between the screw bolt 16 and the positive DC voltage busbar arrangement 8, the clearance c between the screw bolt 14 and the DC voltage busbar arrangement 8/9, and the clearance d between the AC voltage busbar arrangement 4 and the negative DC voltage busbar arrangement 9.

The aforementioned insulation layers 6, 12, 13 and 18 (insulating rings), which extend in an annular configuration along the end faces of perforations, necessitated by AC voltage connections and DC voltage connections, in the busbar arrangements are also used for electrical safety. However, it is also possible to pull down at the edges the insulation foils 19, 20, 21 which are applied to each busbar arrangement and to dispense with insulating rings 6, 12, 13, 18 entirely.

List of Reference Symbols

1 Power semiconductor
2 AC voltage connection
3 DC voltage connection
4 AC voltage busbar arrangement
5 Insulation layer
6 Insulation layer
7 Bush
8 Positive DC voltage busbar arrangement
9 Negative DC voltage busbar arrangement
10 Bush 11 Insulation layer
12 Insulation layer
13 Insulation layer
14 Screw bolt
15 Washer
16 Screw bolt
17 Washer
18 Insulation layer
19 Insulation foil
20 Insulation foil
21 Insulation foil
a Clearance
b Clearance
c Clearance
d Clearance

What is claimed is:

1. A converter appliance having a plurality of power semiconductors and a DC and AC voltage busbar arrangement for making electrical contact with DC and AC voltage connections of the power semiconductors, wherein the busbar arrangement is of two part design, so that the AC voltage busbar arrangement and the DC voltage busbar arrangement have no physical connection with one another;

the positive and the negative DC voltage busbar arrangement is designed as a three layer sandwich system with an insulation layer placed in between; and the AC voltage busbar arrangement and/or the DC voltage busbar arrangement is provided with end insulation layers at perforations necessitated by AC voltage connections or DC voltage connections.

2. A converter appliance having a plurality of power semiconductors and a DC and AC voltage busbar arrangement for making electrical contact with DC and AC voltage connections of the power semiconductors, wherein the busbar arrangement is of two part design, so that the AC voltage busbar arrangement and the DC voltage busbar arrangement have no physical connection with one another;

the positive and the negative DC voltage busbar arrangement is designed as a three layer sandwich system with an insulation layer placed in between; and the busbar arrangement is provided with pressed-in bushes of desired length for the purpose of making electrical contact with connections of the power semiconductors.

3. The converter appliance as claimed in claim 2, characterized in that the busbar arrangement is provided with pressed-in bushes of desired length for the purpose of making electrical contact with connections of the power semiconductors.

4. A converter appliance comprising:

at least one power semiconductor comprising a DC voltage connection and an AC voltage connection, each of the voltage connections comprising a busbar mounting arrangement;

a DC voltage busbar arrangement electrically connected to the DC voltage connection, the DC voltage busbar arrangement comprising a positive DC voltage busbar and a negative DC voltage busbar, and at least one of the DC voltage busbars being positioned by the DC busbar mounting arrangement; and an AC voltage busbar electrically connected to the AC voltage connection, the AC voltage busbar being positioned by the AC busbar mounting arrangement, wherein the at least one DC voltage busbar and the AC voltage busbar are positioned by the respective busbar mounting arrangements to produce an airgap of a predetermined size between the AC voltage busbar and the nearest DC voltage busbar, and wherein at least one of the busbar mounting arrangements comprises a sleeve of predetermined length for locating one of the busbars in a position to provide the airgap of predetermined size between the AC voltage busbar and from the nearest DC voltage busbar.

5. The converter appliance as claimed in claim 4, wherein the DC voltage busbar arrangement comprises a three layer sandwich structure having an insulation layer disposed between the positive DC voltage busbar and the negative DC voltage busbar.

6. The converter appliance as claimed in claim 5, wherein the AC voltage busbar and/or the DC voltage busbar arrangement is provided with at least one end insulation layer disposed adjacent to the AC voltage connections or DC voltage connections.

7. The converter appliance as claimed in claim 4, wherein the DC busbar mounting arrangement comprises a first sleeve of predetermined length for locating at least one of the DC voltage busbars, the AC busbar mounting arrangement comprises a second sleeve of predetermined length for locating the AC voltage busbar, and the airgap between the AC voltage busbar and from the nearest DC voltage busbar is determined by the difference in length between the first and second sleeves.

8. The converter appliance as claimed in claim 7, wherein the DC voltage busbar arrangement comprises a three layer sandwich structure having an insulation layer disposed between the positive DC voltage busbar and the negative DC voltage busbar.

9. The converter appliance as claimed in claim 8, wherein the AC voltage busbar and/or the DC voltage busbar arrangement is provided with at least one end insulation layer disposed adjacent to the AC voltage connections or DC voltage connections.

* * * * *